(12) United States Patent
Merzougui et al.

(10) Patent No.: US 7,767,330 B2
(45) Date of Patent: Aug. 3, 2010

(54) CONDUCTIVE MATRICES FOR FUEL CELL ELECTRODES

(75) Inventors: Belabbes Merzougui, Warren, MI (US); Ion C. Halalay, Grosse Pointe, MI (US); Michael K. Carpenter, Troy, MI (US); Swathy Swathirajan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1129 days.

(21) Appl. No.: 11/415,346

(22) Filed: May 1, 2006

(65) Prior Publication Data

US 2006/0251954 A1 Nov. 9, 2006

Related U.S. Application Data

(60) Provisional application No. 60/677,781, filed on May 4, 2005.

(51) Int. Cl.
*H01M 4/86* (2006.01)
*H01M 4/92* (2006.01)

(52) U.S. Cl. .......................................... 429/44; 429/40
(58) Field of Classification Search ................ None
See application file for complete search history.

(56) References Cited

U.S. PATENT DOCUMENTS

| | | | |
|---|---|---|---|
| 4,795,684 A * | 1/1989 | Jalan et al. | 429/44 |
| 6,297,185 B1 | 10/2001 | Thompson et al. | |
| 6,372,376 B1 * | 4/2002 | Fronk et al. | 429/41 |
| 7,622,216 B2 * | 11/2009 | Halalay et al. | 429/42 |

* cited by examiner

*Primary Examiner*—John S Maples
(74) *Attorney, Agent, or Firm*—Reising Ethington P.C.

(57) ABSTRACT

The durability of a fuel cell having a polymer electrolyte membrane with an anode on one surface and an oxygen-reducing cathode on the other surface is improved by replacing conductive carbon matrix materials in an electrode with a matrix of electrically conductive metal compound particles. The electrode includes a catalyst supported on a nanosize metal oxides and electrically conductive nanosize matrix particles of a metal compound. One or more metal compounds such as a boride, carbide, nitride, silicide, carbonitride, oxyboride, oxycarbide, or oxynitride of a metal such as cobalt, chromium, nickel, molybdenum, neodymium niobium, tantalum, titanium, tungsten, vanadium, and zirconium is suitable. For example, the combination of platinum particles deposited on titanium dioxide support particles mixed in a conductive matrix of titanium carbide particles provides an electrode with good oxygen reduction capability and corrosion resistance in an acid environment.

15 Claims, 2 Drawing Sheets

CONDUCTIVE MATRICES FOR FUEL CELL ELECTRODES

CROSS-REFERENCE TO RELATED APPLICATION

This application claims the benefit of U.S. Provisional Application 60/677,781 filed May 4, 2005 and titled "Conductive Matrices for Fuel Cell Electrodes."

TECHNICAL FIELD

This invention pertains to low temperature acid and alkaline fuel cells such as the ones employing a solid polymer electrolyte membrane in each cell with catalyst-containing electrodes on each side of the membrane. More specifically, this invention pertains to electrode members for such cells where the electrodes include electrically conductive, metal compound matrix particles used in combination with non-conductive catalyst support particles.

BACKGROUND OF THE INVENTION

Fuel cells are electrochemical cells that are being developed for motive and stationary electric power generation. One fuel cell design uses a solid polymer electrolyte (SPE) membrane or proton exchange membrane (PEM), to provide ion transport between the anode and cathode. Gaseous and liquid fuels capable of providing protons are used. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. Each electrode has carried finely divided catalyst particles (for example, platinum particles), supported on carbon particles, to promote ionization of hydrogen at the anode and reduction of oxygen at the cathode. Protons flow from the anode through the ionically conductive polymer membrane to the cathode where they combine with oxygen to form water, which is discharged from the cell. Conductor plates carry away the electrons formed at the anode.

Currently, state of the art PEM fuel cells utilize a membrane made of one or more perfluorinated ionomers such as DuPont's Nafion®. The ionomer carries pendant ionizable groups (e.g. sulfonate groups) for transport of protons through the membrane from the anode to the cathode.

A significant problem hindering the large scale implementation of fuel cell technology is the loss of performance during extended operation, the cycling of power demand during normal automotive vehicle operation as well as vehicle shut-down/start-up cycling. This invention is based on the recognition that a considerable part of the performance loss of PEM fuel cells is associated with the degradation of the oxygen reduction electrode catalyst. This degradation is probably caused by growth of platinum particles, dissolution of platinum particles, and corrosion of the carbon support material. The presence of sulfonate groups and water in the cell creates an acidic environment that contributes to these changes in the electrodes of each cell.

Carbon has been found to corrode severely at electrical potentials above 1.2V and the addition of platinum particles onto the surface of the carbon increases the corrosion rate considerably at potentials below 1.2 V. These processes lead to a loss in active surface area of the platinum catalyst that leads to loss in oxygen electrode performance. However, cycling experiments have revealed that the loss of hydrogen adsorption area alone cannot explain the loss in oxygen performance. Additional factors include interference from adsorbed OH species and a possible place-exchange of adsorbed OH species that can alter the electrocatalytic properties of the platinum catalyst towards oxygen reduction. Thus the specific interaction of platinum with the catalyst support can have an enormous influence on the stability of performance of the Pt electrocatalyst.

It is desirable to remove carbon from the cell electrodes and use other catalyst support materials and other electronically conductive matrix materials.

SUMMARY OF THE INVENTION

In accordance with one aspect of this invention, platinum or other catalyst material is supported on an electrically non-conductive, high surface area, metal oxide such as titanium oxide ($TiO_2$). Then, in another aspect of the invention, the platinized titania is mixed with electrically conductive, corrosion-resistant nanometer size matrix particles of a suitable metal compound.

These metal compounds contain one or more of the non-metallic elements: boron, carbon, nitrogen, or silicon. The borides, carbides, nitrides, and silicides of, for example, cobalt, chromium, molybdenum, neodymium, nickel, niobium, tantalum, titanium, tungsten, vanadium, and zirconium exhibit electrical conductivities akin to metals (i.e. resistivity in the range 3 to 300µΩ cm) and outstanding chemical oxidation and corrosion resistance. These interstitial compounds include e.g. $Co_2B$, $Co_3B$, $Cr_2B$, $CrB$, $Cr_5B_3$, $CrB_2$, $MoB$, $Mo_2B$, $Mo_2B_5$, $NbB$, $NbB_2$, $NbB_6$, $NiB$, $Ni_2B$, $Ni_3B$, $TaB$, $TaB_2$, $TiB_2$, $VB$, $VB_2$, $W_2B$, $WB$, $WB_2$, $W_2B_5$, $ZrB_2$, $ZrB_{12}$; $Co_2C$, $Cr_3C_2$, $NbC$, $Nb_2C$, $TiC$, $VC$, $WC$, $ZrC$; $Co_2N$, $CrN$, $Cr_2N$, $NbN$, $TiN$, $VN$, $WN$, $TaN$, $ZrN$, $CoSi_2$, $CrSi_2$, $Cr_5Si_3$, $MoSi_2$, $Mo_5Si_3$, $Ni_2Si$, $NiSi_2$, $NbSi_2$, $Nb_5Si_3$, $TaSi_2$, $TiSi_2$, $TiSi$, $Ti_5Si_3$, $V_3Si$, $VSi_2$, $WSi_2$, $W_5Si_3$, and $ZrSi_2$. These metal compounds often contain the element oxygen as an impurity, which is tolerable provided suitable conductivity of the support material is maintained. Individual compounds may be used or mixtures of these compounds in various proportions may be used. The metal compounds may contain combinations of the non-metallic elements as in carbonitride compounds. And the metal compounds may contain additional non-metallic elements, such as the element oxygen in metal oxyboride, oxycarbide and oxynitride compounds, provided they provide suitable conductivity and durability in the cell.

One or more of these metal compounds is adapted for use as a particulate, electrically conductive matrix material in supported catalyst containing electrode members of fuel cells. Thus, the membrane electrode assembly in each cell of a hydrogen-oxygen fuel cell stack would include a suitable proton exchange membrane with a thin hydrogen oxidation anode on one side and an oxygen reduction cathode on the other side. In at least the cathode, or in both electrodes, the catalyst is supported on non-conductive metal oxide particles which are intimately mixed with such conductive metal compound matrix particles. Nanometer size conductive metal compound particles are preferred.

The combination of metal oxide catalyst support particles and metal compound matrix particles can yield durable and well performing electrodes in the cell. The unique properties of these catalyzed-electrode, conductive matrix materials, especially as nanosized particles, can lead to enhanced catalytic behavior as well as increased durability of the fuel cell electrodes.

As a specific example, the fuel cell cathode includes catalytic particles of platinum dispersed on high surface area nanometer sized particles of titanium dioxide, and these non-electrically conductive oxide support particles are mixed with matrix particles of electrically conductive, corrosion-resistant nanosized titanium nitride or titanium silicide. The titanium dioxide particles promote strong interaction with their loading of platinum particles, and the titanium nitride or silicide matrix particles provide electrical conductivity to the electrode. Both the support material and matrix material resist electrode performance degradation during potential cycling.

The use of metal compound electrically conductive electrode matrix particles is applicable in low temperature (e.g., less than about 200° C.) acid and alkaline fuel cells.

Other objects and advantages of the invention will become more apparent from a description of exemplary preferred embodiments which follow.

DESCRIPTION OF PREFERRED EMBODIMENTS

Many United States patents assigned to the assignee of this invention describe electrochemical fuel cell assemblies having an assembly of a solid polymer electrolyte membrane and electrode assembly. For example, FIGS. 1-4 of U.S. Pat. No. 6,277,513 include such a description, and the specification and drawings of that patent are incorporated into this specification by reference.

Figure 1:
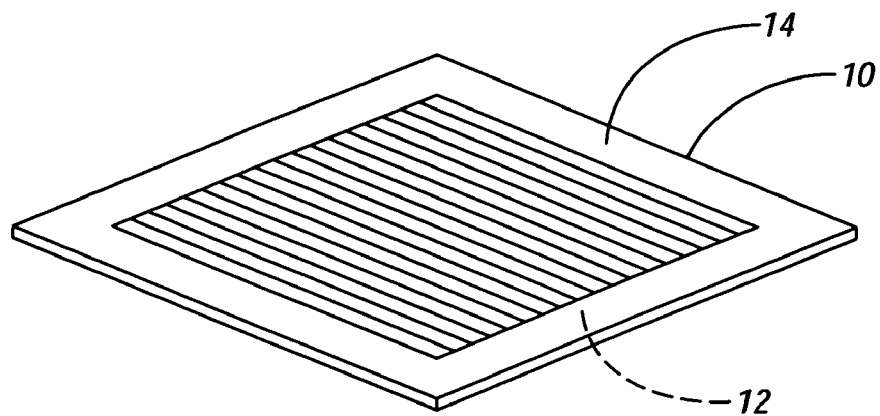
FIG. 1 is a schematic view of a combination of solid polymer membrane electrolyte and electrode assembly (MEA) used in each cell of an assembled fuel cell stack.

FIG. 1 of this application illustrates a membrane electrode assembly 10 which is a part of the electrochemical cell illustrated in FIG. 1 of the '513 patent. Referring to FIG. 1 of this specification, membrane electrode assembly 10 includes anode 12 and cathode 14. In a hydrogen/oxygen (air) fuel cell, for example, hydrogen is oxidized to $H^+$ (proton) at the anode 12 and oxygen is reduced to water at the cathode 14.

Figure 2:
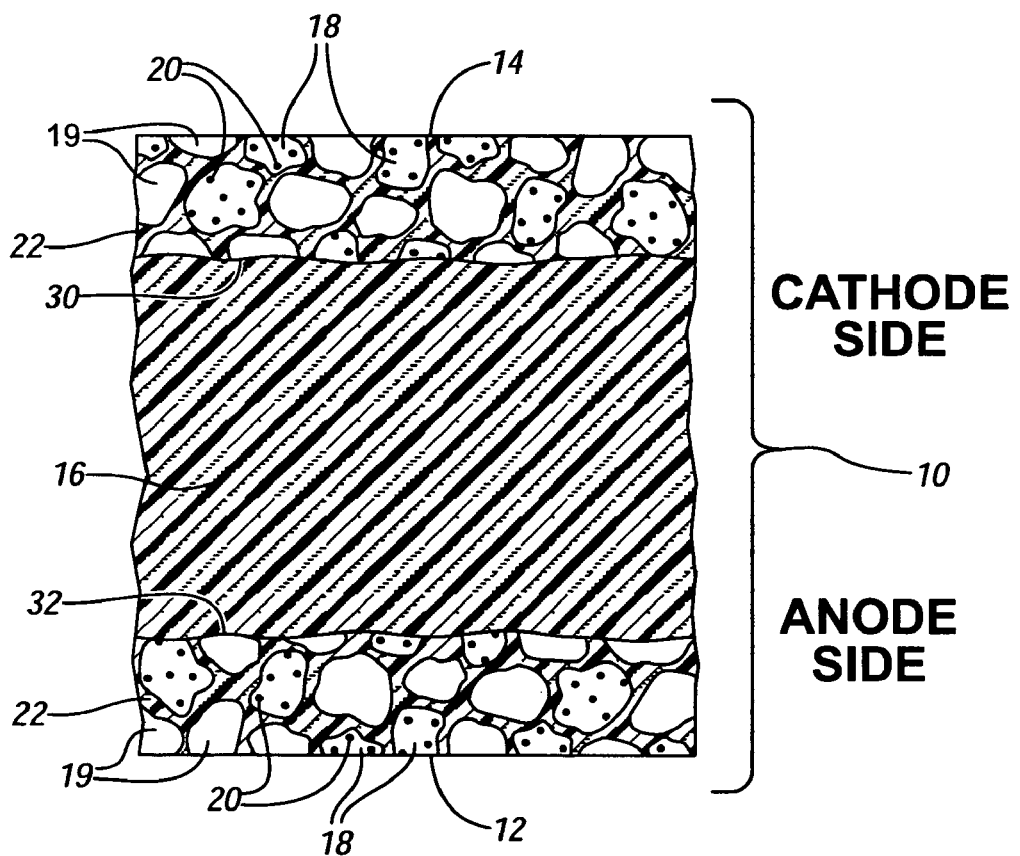
FIG. 2 is an enlarged fragmentary cross-section of the MEA of FIG. 1.
Figure 3:
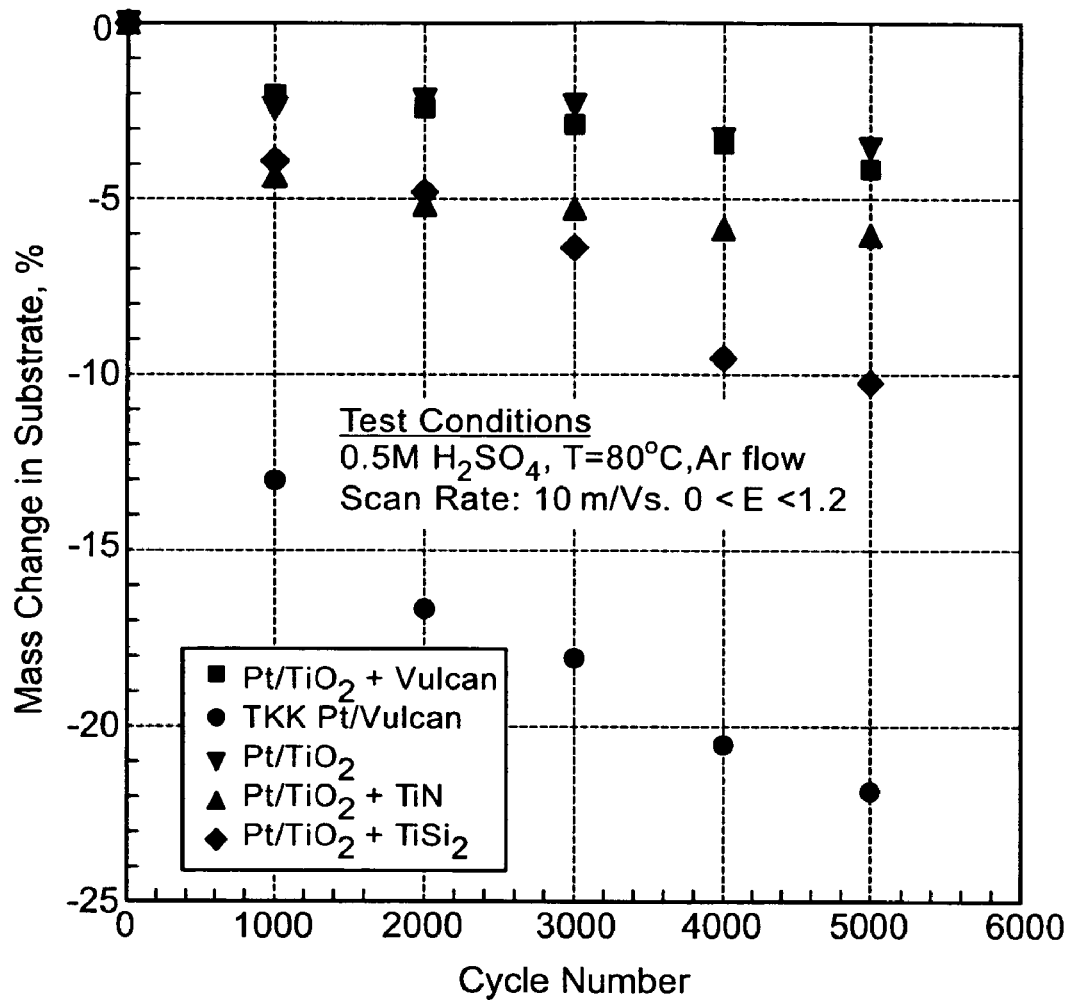
FIG. 3 is a graph of the relative mass loss as a function of cycle number for (i) a benchmark commercial catalyst of platinum deposited on carbon (filled circles), for (ii) a catalyst of platinum deposited on nanosize titanium oxide support particles (filled inverted triangles), and for, in accordance with this invention, a catalyst of platinum deposited on nanosize titanium oxide support particles in several electrically conductive matrices: (iii) carbon (filled squares), (iv) TiN (filled upward triangles), and (v) $TiS_2$ (filled diamonds).

FIG. 2 provides a greatly enlarged, fragmented, cross-sectional view of the membrane electrode assembly shown in FIG. 1. In FIG. 2, anode 12 and cathode 14 are applied to opposite sides (sides 32, 30 respectively) of a proton exchange membrane 16. PEM 16 is suitably a membrane made of a perfluorinated ionomer such as Dupont's Nafion®. The ionomer molecules of the membrane carry pendant ionizable groups (e.g. sulfonate groups) for transport of protons through the membrane from the anode 12 applied to the bottom surface 32 of the membrane 16 to the cathode 14 which is applied to the top surface 30 of the membrane 16. In an exemplary cell, the polymer electrolyte membrane 16 may have dimensions of 100 mm by 100 mm by 0.05 mm. As will be described, the anode 12 and cathode 14 are both thin, porous electrode members prepared from inks and applied directly to the opposite surfaces 30, 32 of the PEM 16 through decals.

In accordance with this invention, cathode 14 suitably includes nanometer size, metal oxide catalyst support particles 18 of, for example, titanium oxide. Nanometer size includes particles having diameters or largest dimensions in the range of about 1 to about 100 nm. The metal oxide catalyst support particles 18 carry smaller particles 20 of a reduction catalyst for oxygen, such as platinum. The platinized titanium oxide support particles 18 are intimately mixed with electrically conductive, matrix particles 19 of a suitable metal compound, such as titanium nitride (or titanium silicide or titanium carbide). Both the platinized metal oxide support particles 18 and the electron conductive metal compound matrix particles 19 are embedded in a suitable bonding material 22. In this embodiment, the bonding material 22 is suitably a perfluorinated ionomer material like the polymer electrolyte membrane 16 material. The perfluorinated ionomer bonding material 22 conducts protons, but it is not a conductor of electrons. Accordingly, a sufficient amount of electrically conductive, metal compound matrix particles are incorporated into cathode 14 so that the electrode has suitable electrical conductivity.

A formulated mixture of the platinum particle 20—bearing catalyst support particles 18, electrically conductive metal compound matrix particles 19, and particles of the electrode bonding material 22 is suspended in a suitable volatile liquid vehicle and applied to surface 30 of proton exchange membrane 16. The vehicle is removed by vaporization and the dried cathode 14 material further pressed and baked into surface 30 of PEM 16 to form cathode 16.

In contrast to prior art membrane electrode assemblies, assembly 10 contains platinum catalyst 20 is supported on nanometer size, high surface area titanium oxide particles rather than conductive carbon support particles. And electrical conductivity in cathode 16 is provided by matrix particles 19 of a suitable durable and electrically conductive metal compound(s). In this example, titanium nitride particles 19 replace all carbon conductive material in the cathode 14 other than the catalyst support particles. In the FIG. 2 embodiment of the invention, the anode 12 is constructed of the same materials as cathode 14. But anode 12 may employ carbon support particles or matrix particles, or a different combination of conductive metal compound matrix particles and metal oxide catalyst support particles.

Titanium nitride conductive matrix particles (or titanium disilicide particles) 19 were used in the FIG. 2 embodiment. But a different carbide, boride, nitride, silicide, oxyboride, oxycarbide, oxynitride, or carbonitride of a metal such as chromium, cobalt, molybdenum, neodymium, nickel, niobium, tantalum, titanium, tungsten, vanadium, or zirconium may be substituted where suitable. Moreover, the conductive matrix particles may comprise a mixture of two or more such metal compounds.

As stated, the purpose of replacing carbon in the membrane electrode assembly with the identified compounds is to improve the effective life of the cell. The oxygen reduction performance of the catalyst can thus be stabilized during load cycling and unmitigated stop-start cycling of fuel cells for automotive applications, where the cathode potential can shift above 1.4 V. Carbon corrosion is the major factor that limits the useful life of present fuel cell cathodes. But the life of such fuel cell electrodes is improved by the replacement of carbon conductive matrix material with particles of a conductive compound of a suitable metal with at least one of boron, carbon, nitrogen, or silicon (and oxygen).

Also as stated, the above illustrated metal borides, metal carbides, metal nitrides, and metal silicides exhibit electrical conductivities akin to metals (i.e. resistivity in the range 3 to 300μΩ cm) and outstanding chemical oxidation and corrosion resistance. The unique and useful properties of these materials, especially as nanosized particles, can lead to enhanced catalytic behavior as well as increased durability of the fuel cell electrodes.

Chemical corrosion rates in aqueous 0.5M $H_2SO_4$ at room temperature for several of these materials are listed in Table 1.

TABLE 1

| | Material | | | | |
|---|---|---|---|---|---|
| | TaC | WC | TiN | TiC | ZrC |
| Dissolution Rate, μmole m$^{-2}$ week$^{-1}$ | 0.065 | 0.12 | 3.9 | 5.6 | 24 |

Electrochemical corrosion rates in 0.5M $H_2SO_4$ at 95° C. for a commercial carbon, titanium carbide and titanium nitride are presented in the following Table 2.

| | Material | | |
|---|---|---|---|
| | Carbon | TiC | TiN |
| Corrosion Rate at E = 1.2 V, μmole m$^{-2}$ hr$^{-1}$ | −87 | −14 | −22 |

Titanium nitride powder of 100 nm particle size with a specific surface area of 20 m$^2$/g were obtained and used as conductive matrix particles in an illustrative embodiment of this invention. Titanium disilicide powder of one micrometer particle size and specific surface area of 0.5 m$^2$/g was used in another illustrative embodiment of this invention. Vulcan XC-72R carbon (specific surface area of 230 m$^2$/g) was used in yet another illustrative embodiment of the present invention.

A catalyst comprising platinum particles deposited on particles of titanium dioxide ($TiO_2$, titania) was prepared. The preparation included using hydrazine to reduce chloroplatinic acid in the presence of carbon monoxide to produce platinum nanoparticles on titanium dioxide particles of 100 nm particle size. Specifically, 1.00 g of $TiO_2$ (50 m$^2$/g) was mixed with 1.80 g of $H_2PtCl_6$ in 170 ml $H_2O$. The pH was adjusted to 5 with 1M NaOH and the mixture was sonicated for 15 minutes. The mixture was then stirred while CO was bubbled through the solution at 200 sccm for 15 minutes. A solution of 0.21 g of hydrazine hydrate in 10 ml was added drop-wise to the reaction mixture and the CO bubbling was continued for an hour. The CO flow was then reduced to 50 sccm and the mixture was allowed to continue to react for 16 hours. Very small particles of platinum (average 3.2 nm) were deposited on the nanosized titanium dioxide particles. The supported catalyst product was filtered and washed with copious amounts of water before being allowed to air dry. Final drying was accomplished at room temperature under vacuum. The platinum catalyst had a hydrogen adsorption area of 30 m$^2$/g.

Thick films (ca. 0.1 mm in thickness) were prepared though the roll and paste method by mixing several 50:50 mixtures of 32% Pt/$TiO_2$ catalyst particles and matrix particles of Vulcan XC-72R carbon, TiN and $TiSi_2$, with 10% Teflon binder. Working electrodes in the form of pellets were then prepared by pressing circular disks (~9 mm in diameter) cut from these sheets onto gold current collectors under a pressure of 1.6 tons/cm$^2$. Similarly, thick films were prepared from Pt/$TiO_2$ and 10% Teflon binder, as well as commercially available platinum catalyst containing 47% wt platinum on Vulcan XC-72R carbon, and benchmark electrodes were prepared from these sheets as previously described.

The durability of these electrodes was evaluated by measuring mass changes that occurred during extended potential cycling at 10 mV/s between the potential limits of 0 and 1.2 V/rhe. The resulting data is summarized in FIG. 3. Mass determinations were every 200 cycles, after a rinse and soak in distilled deionized water followed by vacuum oven drying. Cycling was then resumed after each weighing operation. Each pellet electrode was cycled at a constant scan rate of 10 mV/s in a 3-electrode cell comprised of the working electrode, a carbon counter electrode and a sealed hydrogen reference electrode. The cell was filled with an aqueous 0.5M $H_2SO_4$ solution held at a constant temperature of 80° C. and was de-aerated by bubbling argon through the electrode over the entire duration of the experiment.

Note both the reduced mass for the electrodes made of Pt/$TiO_2$ catalyst and an electrically conductive matrix material, when compared with the benchmark catalyst made of platinum deposited on carbon.

The combinations of platinum on titanium dioxide in a titanium nitride matrix and a titanium disilicide matrix as a fuel cell electrode material have been described for purposes of illustrative examples. But the use of catalyst metals generally (noble metals, alloys of noble metals with other metals and non-noble metal catalysts) on non-conductive metal oxides supports is within the scope of this invention. And the use of such supported catalysts with another electrically conductive and acid/alkali resistant metal compound(s) matrix material is within the scope of this invention. Suitable conductive matrix materials include one or more metal compounds of a suitable metal element(s) combined with one or more of the non-metal elements: boron, carbon, nitrogen, and silicon. These nonmetal elements may be combined with oxygen in the metal compound. The invention is applicable for use in low temperature (operating at less than about 200° C.) acid and alkaline fuel cells.

The invention claimed is:

1. A fuel cell comprising:
   a polymer electrolyte membrane sandwiched between an anode and a cathode;
   at least one of the anode and cathode comprising particles of a catalyst carried on non- conductive catalyst support particles in a matrix of conductive particles, the conductive matrix particles consisting essentially of a metal compound containing a nonmetal element selected from the group consisting of boron, carbon, nitrogen, and silicon, the metal compound having a resistivity in the range of less than 300 μΩcm.

2. A fuel cell as recited in claim 1 in which the conductive matrix particles consist essentially of at least one of a metal boride, metal carbide, metal nitride, metal silicide, metal oxyboride, metal oxycarbide, metal oxynitride, or metal carbonitride.

3. A fuel cell as recited in claim 1 in which the conductive particles consist essentially of a metal compound containing a metal selected from the group consisting of chromium, cobalt, molybdenum, neodymium, nickel, niobium, tantalum, titanium, tungsten, vanadium, and zirconium.

4. A fuel cell as recited in claim 1 in which the metal matrix particles consist essentially of at least one metal compound selected from the group consisting of $Co_2B$, $Co_3B$, $Cr_2B$, CrB, $Cr_5B_3$, $CrB_2$, MoB, $Mo_2B$, $Mo_2B_5$, NbB, $NbB_2$, $NbB_6$, NiB, $Ni_2B$, $Ni_3B$, TaB, $TaB_2$, $TiB_2$, VB, $VB_2$, $W_2B$ WB, $WB_2$, $W_2B_5$, $ZrB_2$, $ZrB_{12}$; $Co_2C$, $Cr_3C_2$, NbC, $Nb_2C$, TiC, VC, WC, ZrC; $Co_2N$, CrN, $Cr_2N$, NbN, TiN, VN, WN, TaN, ZrN, $CoSi_2$, $CrSi_2$, $Cr_5Si_3$, $MoSi_2$, $Mo_5Si_3$, $Ni_2Si$, $NiSi_2$, $NbSi_2$, $Nb_5Si_3$, $TaSi_2$, $TiSi_2$, TiSi, $Ti_5Si_3$, $V_3Si$, $VSi_2$, $WSi_2$, $W_5Si_3$, and $ZrSi_2$.

5. An acid or alkaline fuel cell operating at a temperature no higher than about 200° C. and comprising:
   a polymer electrolyte membrane sandwiched between an anode and an oxygen-reducing cathode;
   the oxygen-reducing cathode-comprising particles of an oxygen-reducing catalyst carried on non-conductive catalyst support particles in a matrix of conductive particles, the conductive matrix particles consisting essentially of at least one of a metal boride, metal carbide, metal nitride, metal silicide, metal oxyboride, metal oxycarbide, metal oxynitride, or metal carbonitride.

6. A fuel cell as recited in claim 5 in which the oxygen-reducing cathode comprises conductive matrix particles containing one or more metal elements selected from the group consisting of chromium, cobalt, molybdenum, neodymium, nickel, niobium, tantalum, titanium, tungsten, vanadium, and zirconium.

7. A fuel cell as recited in claim 5 in which the oxygen-reducing cathode comprises conductive matrix particles consisting essentially of at least one metal compound selected from the group consisting of $Co_2B$, $Co_3B$, $Cr_2B$, CrB, $Cr_5B_3$, $CrB_2$, MoB, $Mo_2B$, $Mo_2B_5$, NbB, $NbB_2$, $NbB_6$, NiB, $Ni_2B$, $Ni_3B$, TaB, $TaB_2$, $TiB_2$, VB, $VB_2$, $W_2B$ WB, $WB_2$, $W_2B_5$, $ZrB_2$, $ZrB_{12}$; $Co_2C$, $Cr_3C_2$, NbC, $Nb_2C$, TiC, VC, WC, ZrC; $Co_2N$, CrN, $Cr_2N$, NbN, TiN, VN, WN, TaN, ZrN, $CoSi_2$, $CrSi_2$, $Cr_5Si_3$, $MoSi_2$, $Mo_5Si_3$, $Ni_2Si$, $NiSi_2$, $NbSi_2$, $Nb_5Si_3$, $TaSi_2$, $TiSi_2$, TiSi, $Ti_5Si_3$, $V_3Si$, $VSi_2$, $WSi_2$, $W_5Si_3$, and $ZrSi_2$.

8. A fuel cell as recited in claim 5 in which the oxygen-reducing cathode comprises a catalyst for oxygen reduction carried on metal oxide support particles, the catalyst being a material selected from the group consisting of noble metals and alloys of platinum with non-noble metals.

9. A fuel cell as recited in claim 5 in which the oxygen-reducing cathode comprises a noble metal carried on a metal oxide and the conductive matrix particles consist essentially of at least one boride, carbide, nitride, silicide, oxyboride, oxycarbide, oxynitride, or carbonitride of at least one metal selected from the group consisting of chromium, cobalt, molybdenum, neodymium, nickel, niobium, tantalum, titanium, tungsten, vanadium, and zirconium.

10. A fuel cell as recited in claim 5 in which the oxygen-reducing cathode comprises a material selected from one of the group consisting of (i) one or more noble metals, (ii) alloys of platinum with non-noble metals, or (iii) non-noble metal oxygen reduction catalysts, the catalyst particles being carried on particles of a metal oxide; and the conductive matrix particles consist essentially of at least one metal compound selected from the group consisting of $Co_2B$, $Co_3B$, $Cr_2B$, CrB, $Cr_5B_3$, $CrB_2$, MoB, $Mo_2B$, $Mo_2B_5$, NbB, $NbB_2$, $NbB_6$, NiB, $Ni_2B$, $Ni_3B$, TaB, $TaB_2$, $TiB_2$, VB, $VB_2$, $W_2B$ WB, $WB_2$, $W_2B_5$, $ZrB_2$, $ZrB_{12}$; $Co_2C$, $Cr_3C_2$, NbC, $Nb_2C$, TiC, VC, WC, ZrC; $Co_2N$, CrN, $Cr_2N$, NbN, TiN, VN, WN, TaN, ZrN, $CoSi_2$, $CrSi_2$, $Cr_5Si_3$, $MoSi_2$, $Mo_5Si_3$, $Ni_2Si$, $NiSi_2$, $NbSi_2$, $Nb_5Si_3$, $TaSi_2$, $TiSi_2$, TiSi, $Ti_5Si_3$, $V_3Si$, $VSi_2$, $WSi_2$, $W_5Si_3$, and $ZrSi_2$.

11. A fuel cell as recited in claim 5 in which the oxygen-reducing cathode comprises platinum carried on titanium dioxide support particles and the conductive matrix particles consist essentially of at least one metal boride, metal carbide, metal nitride, or metal silicide.

12. A fuel cell as recited in claim 5 in which the oxygen-reducing cathode comprises platinum carried on titanium dioxide and the conductive matrix particles consist essentially of at least one metal compound selected from the group consisting of $Co_2B$, $Co_3B$, $Cr_2B$, CrB, $Cr_5B_3$, $CrB_2$, MoB, $Mo_2B$, $Mo_2B_5$, NbB, $NbB_2$, $NbB_6$, NiB, $Ni_2B$, $Ni_3B$, TaB, $TaB_2$, $TiB_2$, VB, $VB_2$, $W_2B$ WB, $WB_2$, $W_2B_5$, $ZrB_2$, $ZrB_{12}$; $Co_2C$, $Cr_3C_2$, NbC, $Nb_2C$, TiC, VC, WC, ZrC; $Co_2N$, CrN, $Cr_2N$, NbN, TiN, VN, WN, TaN, ZrN, $CoSi_2$, $CrSi_2$, $Cr_5Si_3$, $MoSi_2$, $Mo_5Si_3$, $Ni_2Si$, $NiSi_2$, $NbSi_2$, $Nb_5Si_3$, $TaSi_2$, $TiSi_2$, TiSi, $Ti_5Si_3$, $V_3Si$, $VSi_2$, $WSi_2$, $W_5Si_3$, and $ZrSi_2$.

13. A fuel cell as recited in claim 5 in which the oxygen-reducing cathode comprises platinum carried on titanium dioxide support particles and the conductive matrix particles comprise a least one of titanium nitride and titanium silicide.

14. A fuel cell comprising:
   a polymer electrolyte membrane sandwiched between a hydrogen-oxidizing anode and an oxygen-reducing cathode;
   the hydrogen-oxidizing anode comprising particles of a hydrogen-oxidizing catalyst carried on non-conductive catalyst support particles in a matrix of conductive particles of a metal compound consisting essentially of at least one metal boride, metal carbide, metal nitride, metal silicide, metal oxyboride, metal oxycarbide, metal oxynitride, or metal carbonitride; and
   the oxygen-reducing cathode comprising particles of an oxygen-reducing catalyst carried on non-conductive catalyst support particles in a matrix of conductive particles of a metal compound consisting essentially of at least one metal boride, metal carbide, metal nitride, metal silicide, metal oxyboride, metal oxycarbide, metal oxynitride, or metal carbonitride.

15. A fuel cell as recited in claim 14 in which the oxygen-reducing cathode comprises platinum carried on titanium dioxide.

* * * * *